(12) United States Patent
Lee et al.

(10) Patent No.: US 10,983,385 B2
(45) Date of Patent: Apr. 20, 2021

(54) DISPLAY DEVICE

(71) Applicant: Samsung Display Co., Ltd., Yongin-si (KR)

(72) Inventors: Hyunsup Lee, Seoul (KR); Hyesog Lee, Osan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 74 days.

(21) Appl. No.: 16/221,227

(22) Filed: Dec. 14, 2018

(65) Prior Publication Data

US 2019/0200007 A1 Jun. 27, 2019

(30) Foreign Application Priority Data

Dec. 26, 2017 (KR) ........................ 10-2017-0179399

(51) Int. Cl.
*G02F 1/1335* (2006.01)
*G02F 1/1362* (2006.01)

(52) U.S. Cl.
CPC .. *G02F 1/133514* (2013.01); *G02F 1/133512* (2013.01); *G02F 1/136286* (2013.01); *G02F 2201/52* (2013.01)

(58) Field of Classification Search
CPC ......... G02F 1/133512; G02F 1/133514; G02F 2001/136222; G02F 2201/52; G02F 1/136286; G09G 3/2003; G09G 2300/0452; G09G 2300/0443; G09G 3/3607; G09G 3/3611; G09G 5/02; G09G 2320/068; G09G 2320/028; G02B 5/201; H01L 27/322; H01L 27/3213; H01L 27/3218; H01L 27/3211; H04N 13/324
See application file for complete search history.

(56) References Cited

U.S. PATENT DOCUMENTS

| | | | |
|---|---|---|---|
| 8,363,072 B2 * | 1/2013 | Hong | .................... H01L 27/326 345/694 |
| 2007/0046777 A1 | 3/2007 | Song et al. | |
| 2011/0275270 A1 * | 11/2011 | Matsuoka | ......... G02F 1/136259 445/2 |
| 2012/0194412 A1 * | 8/2012 | Kimura | ................ G09G 3/3241 345/76 |
| 2013/0135293 A1 | 5/2013 | Kim et al. | |
| 2013/0161732 A1 | 6/2013 | Hwang et al. | |
| 2013/0175505 A1 * | 7/2013 | Sung | ................... H01L 51/0541 257/29 |
| 2015/0061978 A1 * | 3/2015 | Shih | ..................... G09G 3/3225 345/76 |

(Continued)

FOREIGN PATENT DOCUMENTS

| | | |
|---|---|---|
| KR | 10-2007-0026997 A | 3/2007 |
| KR | 10-2013-0060598 A | 6/2013 |

(Continued)

*Primary Examiner* — Jia X Pan
(74) *Attorney, Agent, or Firm* — Lewis Roca Rothgerber Christie LLP

(57) ABSTRACT

A display device includes a plurality of first pixels and a plurality of second pixels. The first and second pixels are configured to display different colors from each other, and a pitch between adjacent ones of the first pixels in a first direction is different from a pitch between adjacent ones of the second pixels in the first direction.

24 Claims, 8 Drawing Sheets

(56) References Cited

U.S. PATENT DOCUMENTS

| | | | | |
|---|---|---|---|---|
| 2016/0187717 A1* | 6/2016 | Hosokawa | .......... | G02F 1/13394 |
| | | | | 349/110 |
| 2016/0187745 A1* | 6/2016 | Jin | .................... | G02F 1/133512 |
| | | | | 349/110 |
| 2016/0240593 A1* | 8/2016 | Gu | ....................... | G09G 3/3225 |
| 2016/0315126 A1* | 10/2016 | Huang | ................ | H01L 51/0011 |
| 2017/0068130 A1* | 3/2017 | Chen | ................... | G02F 1/13394 |
| 2017/0125448 A1* | 5/2017 | Park | ................... | H01L 27/3216 |
| 2017/0208319 A1 | 7/2017 | Kim et al. | | |
| 2017/0343867 A1* | 11/2017 | Su | .................... | G02F 1/134309 |
| 2018/0120656 A1* | 5/2018 | Okada | ............... | H01L 29/66969 |
| 2018/0308907 A1* | 10/2018 | Jin | ..................... | H01L 27/3218 |
| 2018/0366076 A1* | 12/2018 | Chi | .................. | G02F 1/134309 |
| 2019/0206310 A1* | 7/2019 | Tian | .................... | H01L 27/3218 |
| 2020/0052052 A1* | 2/2020 | Nishimura | .......... | H01L 51/0004 |

FOREIGN PATENT DOCUMENTS

| | | | |
|---|---|---|---|
| KR | 10-2013-0074954 A | 7/2013 | |
| KR | 10-1760453 B1 | 7/2017 | |

* cited by examiner

DISPLAY DEVICE

CROSS-REFERENCE TO RELATED APPLICATION

This application claims priority to and the benefit of Korean Patent Application No. 10-2017-0179399, filed on Dec. 26, 2017 in the Korean Intellectual Property Office (KIPO), the disclosure of which is incorporated by reference herein in its entirety.

BACKGROUND

1. Field

Aspects of embodiments of the present invention relate to a display device.

2. Discussion of Related Art

In general, real 3D images are implemented through the interference of diffracted light.

In conventional display devices, a difference in the diffraction angle occurs depending on the wavelength of light, and thus, interferences may occur at different positions according to the color of light. Accordingly, the image quality of the 3D images may be degraded.

It is to be understood that this Background section is intended to provide useful background for understanding the technology, and as such, this Background section may include or may be formed of ideas, concepts, or recognitions that were not known or appreciated by those skilled in the pertinent art prior to the effective filing date of subject matter disclosed herein.

SUMMARY

Embodiments of the present invention may be directed to a display device displaying 3D images having improved image quality.

According to an embodiment, a display device includes a plurality of first pixels and a plurality of second pixels. The first and second pixels are configured to display different colors from each other, and a pitch between adjacent ones of the first pixels in a first direction is different from a pitch between adjacent ones of the second pixels in the first direction.

A pitch between pixel electrodes of the adjacent ones the first pixels may be different from a pitch between pixel electrodes of the adjacent ones of the second pixels.

The display device may further include a light blocking layer having first holes and second holes. The first holes may define light emission areas of the first pixels, and the second holes may define light emission areas of the second pixels.

A pitch between adjacent ones of the first holes in the first direction may be different from a pitch between adjacent ones of the second holes in the first direction.

The first pixels may be configured to display a color having a wavelength greater than a wavelength of a color displayed by the second pixels, and the pitch between the adjacent ones of the first pixels may be greater than the pitch between the adjacent ones of the second pixels.

The first pixels may be configured to display red, and second pixels may be configured to display one of green or blue.

The first pixels may be configured to display green, and the second pixels may be configured to display blue.

The display device may further include a plurality of third pixels configured to display a color different from colors displayed by the first and second pixels. The pitch between the adjacent ones of the first pixels, the pitch between the adjacent ones of the second pixels, and a pitch between adjacent ones of the third pixels in the first direction may be different from each other.

The first pixels may be configured to display a first color having a first wavelength, the second pixels may be configured to display a second color having a second wavelength, and the third pixels may be configured to display a third color having a third wavelength. The first wavelength may be greater than the second wavelength, and the second wavelength may be greater than the third wavelength. The pitch between the adjacent ones of the first pixels may be greater than the pitch between the adjacent ones of the second pixels, and the pitch between the adjacent ones of the second pixels may be greater than the pitch between the adjacent ones of the third pixels.

The first pixels may be configured to display red, the second pixels may be configured to display green, and the third pixels may be configured to display blue.

The first pixels and the second pixels may be respectively arranged in pixel lines arranged along a second direction which crosses the first direction.

The display device may further include a first data line connected to one of the adjacent ones of the first pixels and to one of the adjacent ones of the second pixels and a second data line connected to the other of the adjacent ones of the first pixels and to the other of the adjacent ones of the second pixels.

A distance between the first data line and the second data line in the pixel line in which the adjacent ones of the first pixels are arranged may be different from a distance between the first data line and the second data line in the pixel line in which the adjacent ones of the second pixels are arranged.

The display device may further include a data line located between the adjacent ones of the first pixels and between the adjacent ones of the second pixels. The data line may be connected to one of the first pixels and is not connected to the second pixels.

The display device may further include a first gate line connected to the adjacent ones of the first pixels and a second gate line connected to the adjacent ones of the second pixels.

According to another embodiment, a display device includes: a plurality of first pixels, each of the first pixels including a first switching element, a first pixel electrode connected to the first switching element, and a first color filter layer located corresponding to the first pixel electrode; and a plurality of second pixels, each of the second pixels including a second switching element, a second pixel electrode connected to the second switching element, and a second color filter layer located corresponding to the second pixel electrode, the second color filter layer configured to emit a color different from a color of the first color filter layer. A pitch between adjacent ones of the first pixel electrodes in a first direction is different from a pitch between adjacent ones of the second pixel electrodes in the first direction.

The display device may further include a light blocking layer having first holes and second holes. The first holes may define light emission areas of the first pixels, and the second holes may define light emission areas of the second pixels.

A pitch between adjacent ones of the first holes in the first direction may be different from a pitch between adjacent ones of the second holes in the first direction.

The first color filter layer may be configured to emit a first color having a first wavelength, and the second color filter layer may be configured to emit a second color having a second wavelength. The first wavelength may be greater than the second wavelength. The pitch between the adjacent ones of the first pixel electrodes may be greater than the pitch between the adjacent ones of the second pixel electrodes.

The first color filter layer may be a red color filter layer, and the second color filter layer may be one of a green color filter layer and a blue color filter layer.

The first color filter layer may be a green color filter layer, and the second color filter layer may be a blue color filter layer.

The display device may further include a plurality of third pixels, each of the third pixels including a third switching element, a third pixel electrode connected to the third switching element, and a third color filter layer located corresponding to the third pixel electrode. The third color filter layer may be configured to emit a color different from the colors of the first and second color filter layers. The pitch between the adjacent ones of the first pixel electrodes, the pitch between the adjacent ones of the second pixel electrodes, and a pitch between adjacent ones of the third pixel electrodes in the first direction may be different from each other.

The first color filter layer may be configured to emit a first color having a first wavelength, the second color filter layer may be configured to emit a second color having a second wavelength, and the third color filter layer may be configured to emit a third color having a third wavelength. The first wavelength may be greater than the second wavelength, and the second wavelength may be greater than the third wavelength. The pitch between the adjacent ones of the first pixel electrodes may be greater than the pitch between the adjacent ones of the second pixel electrodes, and the pitch between the adjacent ones of the second pixel electrodes may be greater than the pitch between the adjacent ones of the third pixel electrodes.

The first color filter layer may be a red color filter layer, the second color filter layer may be a green color filter layer, and the third color filter layer may be a blue color filter layer.

The foregoing is illustrative and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the present invention will be provided by the below detailed description of example embodiments thereof, described with reference to the accompanying drawings, in which.

DETAILED DESCRIPTION

Figure 1:
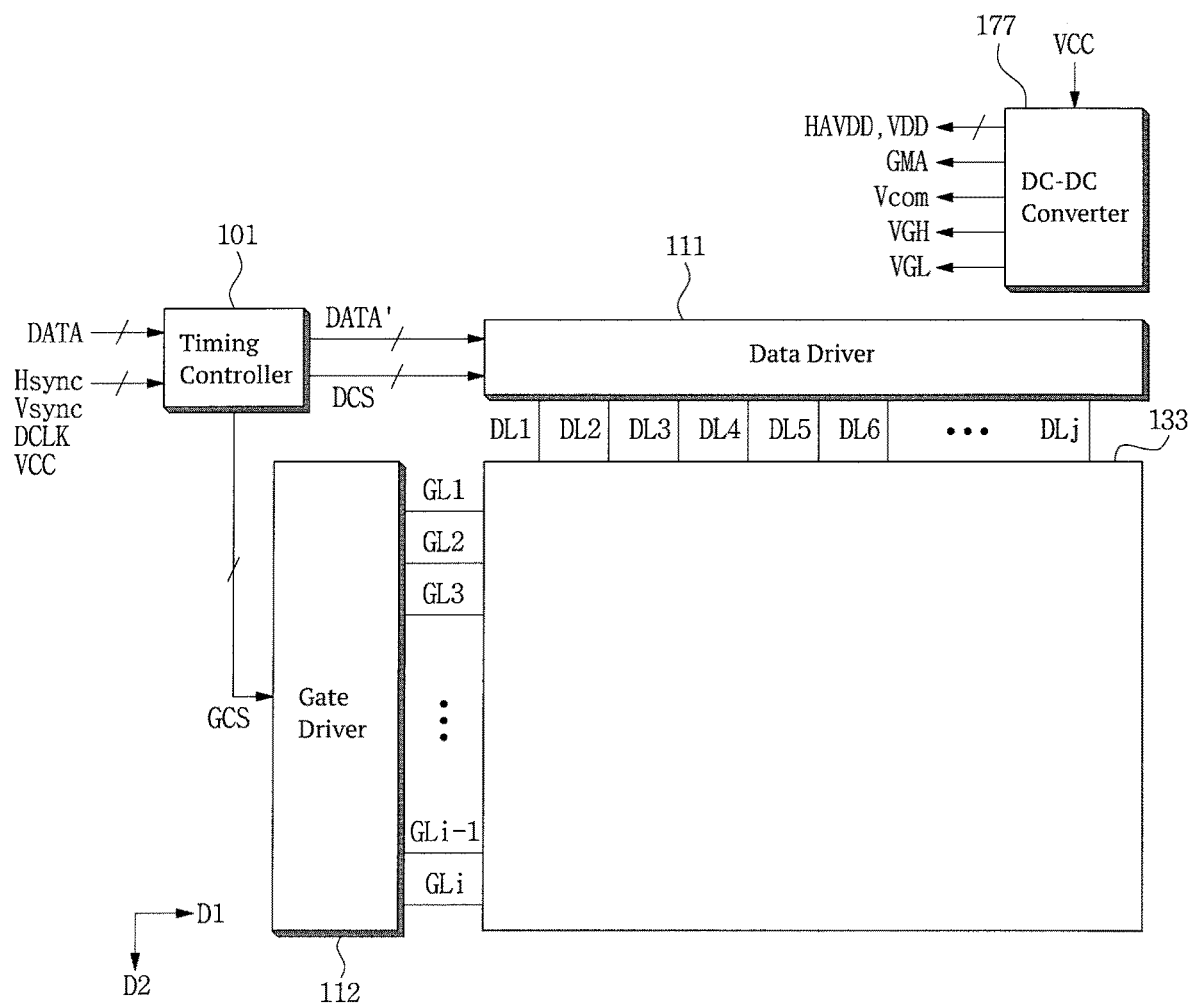
FIG. 1 is a block diagram illustrating a display device according to an embodiment of the present invention.

Example embodiments of the present invention will now be described more fully hereinafter with reference to the accompanying drawings. Although the present invention may be modified in various manners and have several embodiments, example embodiments are illustrated in the accompanying drawings and will be mainly described in the specification. However, the scope of the present invention is not limited to these example embodiments and should be construed as including all changes, equivalents, and substitutions included in the spirit and scope of the present invention.

In the drawings, thicknesses of layers and areas may be illustrated in an enlarged manner for clarity and ease of description. When a layer, area, or plate is referred to as being "on" another layer, area, or plate, it may be directly on the other layer, area, or plate, or intervening layers, areas, or plates may be present therebetween. When a layer, area, or plate is referred to as being "directly on" another layer, area, or plate, no intervening layers, areas, or plates are present therebetween. Further, when a layer, area, or plate is referred to as being "below" another layer, area, or plate, it may be directly below the other layer, area, or plate, or intervening layers, areas, or plates may be present therebetween. When a layer, area, or plate is referred to as being "directly below" another layer, area, or plate, no intervening layers, areas, or plates are present therebetween.

The spatially relative terms, such as "below," "beneath," "lower," "above," "upper," and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, a device positioned "below" or "beneath" another device would then be "above" the other device. Accordingly, the illustrative term "below" may include both the lower and upper positions. The device may also be oriented in the other direction, and the spatially relative terms should be interpreted accordingly.

It will be understood that when an element or layer is referred to as being "connected to" or "coupled to" another element or layer, it may be directly connected or coupled to the other element or layer or one or more intervening elements or layers may also be present. When an element or layer is referred to as being "directly connected to" or "directly coupled to" another element or layer, there are no intervening elements or layers present. It will be further understood that the terms "comprises," "comprising," "includes," and/or "including" and variations thereof, when used in this specification, specify the presence of the stated features, integers, steps, operations, elements, and/or components but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some aspects of the example embodiments which are not necessary for the description may not be described in detail in order to specifically describe embodiments of the present invention, and like reference numerals refer to like elements throughout the specification.

Hereinafter, a display device according to example embodiments of the present invention will be described with reference to FIGS. 1-8.

Figure 2:
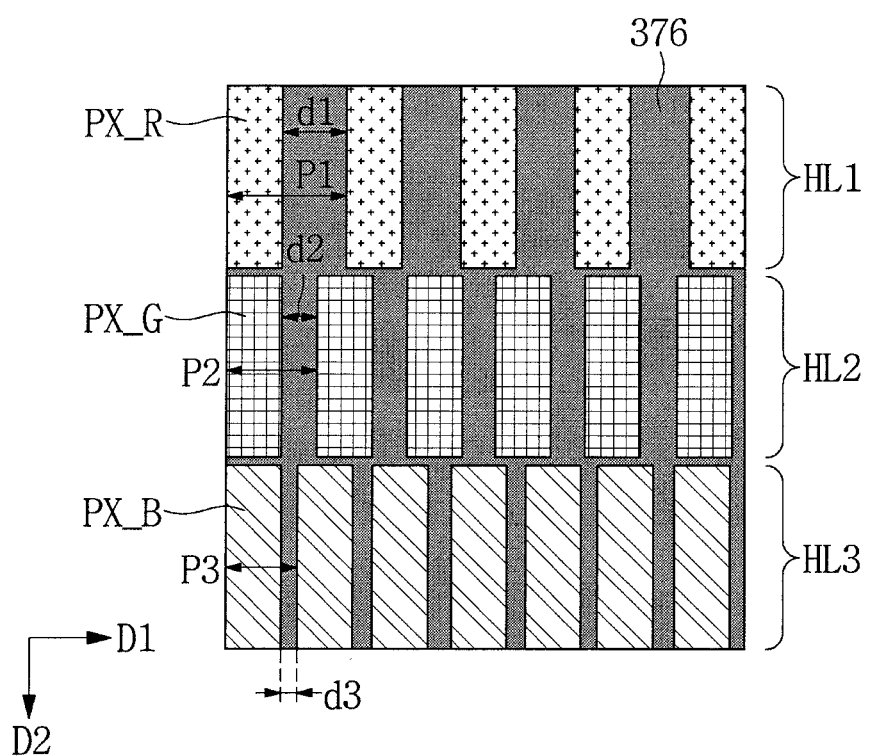
FIG. 2 illustrates several adjacent pixels from among pixels of a display panel shown in FIG. 1.

FIG. 1 is a block diagram illustrating a display device according to an embodiment of the present invention, and FIG. 2 is a view illustrating several adjacent pixels from among pixels of a display panel shown in FIG. 1.

A display device includes a display panel 133, a timing controller 101, a gate driver 112, a data driver 111, and a DC-DC converter 177, as illustrated in FIG. 1.

The display panel 133 displays images. The display panel 133 may be a liquid crystal display ("LCD") panel or an organic light emitting diode ("OLED") display panel. Hereinafter, the display panel 133 will be described as an LCD panel by way of example.

The display panel 133 includes a liquid crystal layer and first and second substrates facing each other with the liquid crystal layer interposed therebetween.

On the first substrate are disposed a plurality of gate lines GL1 to GLi, a plurality of data lines DL1 to DLj crossing the gate lines GL1 to GLi, and a plurality of pixels PX_R, PX_G, and PX_B connected to the gate lines GL1 to GLi and the data lines DL1 to DLj.

Each of the gate lines GL1 to GLi has a linear shape extending in a first direction D1. The first gate lines GL1 to GLi are arranged (e.g., arranged adjacent each other) along a second direction D2. Each of the data lines DL1 to DLj has a linear shape extending in the second direction D2. The data lines DL1 to DLj are arranged (e.g., arranged adjacent each other) along the first direction D1.

In addition, color filter layers may be further disposed on the first substrate. The color filter layers may include a red color filter layer, a green color filter layer, and a blue color filter layer. In an embodiment, the plurality of color filter layers may further include at least one of a cyan color filter layer, a magenta color filter layer, a yellow color filter layer, and a white color filter layer.

A light blocking layer and a common electrode may be disposed on the second substrate. The light blocking layer has a plurality of holes (e.g., openings) which defines a light emission area of each of the pixels PX_R, PX_G, and PX_B.

The red color filter layer is located corresponding to the red pixel PX_R or a light emission area thereof, the green color filter layer is located corresponding to the green pixel PX_G or a light emission area thereof, and the blue color filter layer is located corresponding to the blue pixel PX_B or a light emission area thereof.

The pixels PX_R, PX_G and PX_B may include a red pixel PX_R for displaying red color light, a green pixel PX_G for displaying green color light, and a blue pixel PX_B for displaying blue color light, as illustrated in FIG. 2. The pixels may further include at least one of a cyan pixel, a magenta pixel, a yellow pixel, and a white pixel.

The red pixels PX_R are disposed in a first row HL1 (e.g., a first horizontal line) of the display panel 133. The red pixels PX_R are arranged along the first direction D1 in the first row HL1. The red pixels PX_R may be further disposed, for example, in a fourth row, a seventh row, a tenth row, and the like of the display panel 133. For example, the red pixels PX_R are disposed in (3p−2)-th rows, where p is a natural number.

The green pixels PX_G are disposed in a second row HL2 (e.g., a second horizontal line) of the display panel 133. The green pixels PX_G are arranged along the first direction D1 in the second row HL2. The green pixels PX_G may be further disposed, for example, in a fifth row, an eighth row, an eleventh row, and the like of the display panel 133. For example, the green pixels PX_G are disposed in (3p−1)-th rows.

The blue pixels PX_B are disposed in a third row HL3 (e.g., a third horizontal line) of the display panel 133. The blue pixels PX_B are arranged along the first direction D1 in the third row HL3. The blue pixels PX_B may be further disposed, for example, in a sixth row, a ninth row, a twelfth row, and the like of the display panel 133. For example, the blue pixels PX_B are disposed in 3p-th rows.

The pixels in different columns are arranged along the second direction D2. For example, the red pixel PX_R, the green pixel PX_G, and the blue pixel PX_B are arranged (e.g., arranged adjacent each other) along the second direction D2.

Herein, a pitch (e.g., an interval) between the red pixels PX_R that are adjacent to each other in the first direction D1 is defined as a first pitch P1, a pitch (e.g., an interval) between the green pixels PX_G that are adjacent to each other in the first direction D1 is defined as a second pitch P2, and a pitch (e.g., an interval) between the blue pixels PX_B that are adjacent to each other in the first direction D1 is defined as a third pitch P3. In such an embodiment, the pitch of the pixels is defined as a distance between a specific point of one of two pixels of a same color that are adjacent to each other in the first direction D1 to a specific point of the other of the two pixels corresponding to the specific point of the one of the two pixels. In such an embodiment, the distance is measured in the first direction D1.

The pixels PX_R, PX_G, and PX_B may have different pitches for respective colors. For example, as the wavelength of a color displayed by a pixel increases, the pixel may have a greater pitch. For example, red light has a greatest wavelength (e.g., about 640 nm) from among red light, green light, and blue light, and the red pixel PX_R has the first pitch P1, which is largest from among the three color pixels (e.g., from among the first-third pitches P1, P2, and P3). Further, blue light has a smallest wavelength (e.g., about 450 nm) from among red light, green light, and blue light, and the blue pixel PX_B has the third pitch P3, which is smallest from among the three color pixels (e.g., from among the first-third pitches P1, P2, and P3). In addition, green light has a wavelength (e.g., about 532 nm) between the wavelengths of red light and blue light, and the green pixel PX_G has the second pitch P2, which is greater than the third pitch P3 and less than the first pitch P1.

Due to such a pitch difference, a distance d1 (hereinafter, "a first distance") between adjacent red pixels PX_R, a distance d2 (hereinafter, "a second distance") between adjacent green pixels PX_G, and a distance d3 (hereinafter, "a third distance") between adjacent blue pixels PX_B are different from each other. For example, the first distance d1 is larger than the second distance d2, and the second distance d2 is larger than the third distance d3. For example, the second distance d2 is larger than the third distance d3 and less than the first distance d1.

Because the pitch of the pixels is set in proportion to the wavelength of the display color of the pixels, interference images, which are diffracted according to color, may be displayed at a substantially same position regardless of color. Accordingly, the image quality of 3D images may be improved.

In addition, because the pitch P2 of the green pixel PX_G and the pitch P3 of the blue pixel PX_B are less than the pitch P1 of the red pixel PX_R, the viewing angle of the display device may be improved. For example, because there are a greater number of green pixels PX_G and blue pixels PX_B that have a relatively small pitch than there are red pixels PX_R, the viewing angle may be enhanced.

In an embodiment, all of the pixels including the pixels shown in FIG. 2 may be used to represent 3D images, while some of (e.g., less than all of) the pixels may be used to represent 2D images. For example, a display device for displaying 3D images may have a resolution of about 2,100 pixel per inch (ppi), and a display device for displaying 2D images (e.g., for displaying only 2D images) may have a resolution of about 700 ppi.

The timing controller 101 receives a vertical synchronization signal Vsync, a horizontal synchronization signal Hsync, an image data signal DATA, and a reference clock signal DCLK, which are output from a graphic controller provided in a system. An interface circuit is provided between the timing controller 101 and the system, and the aforementioned signals output from the system are input to the timing controller 101 through the interface circuit. The interface circuit may be embedded in the timing controller 101.

The interface circuit may include a low voltage differential signaling (LVDS) receiver. The interface circuit lowers voltage levels of the vertical synchronization signal Vsync, the horizontal synchronization signal Hsync, the image data signal DATA, and the reference clock signal DCLK output from the system while raising frequencies thereof.

In an embodiment, electromagnetic interference (EMI) may occur due to high frequency components of a signal input from the interface circuit to the timing controller 101. In order to substantially prevent the EMI, an EMI filter may be further provided between the interface circuit and the timing controller 101.

The timing controller 101 generates a gate control signal GCS for controlling the gate driver 112 and a data control signal DCS for controlling the data driver 111 using the vertical synchronization signal Vsync, the horizontal synchronization signal Hsync, and the reference clock signal DCLK.

The gate control signal GCS includes a gate start pulse, a gate shift clock, a gate output enable signal, and the like. The data control signal DCS includes a source start pulse, a source shift clock, a source output enable signal, a polarity signal, and the like.

In addition, the timing controller 101 rearranges the image data signals DATA input through the system and applies the rearranged image data signals DATA' to the data driver 111.

In an embodiment, the timing controller 101 is driven by a driving power VCC output from a power unit provided in the system. For example, the driving power VCC is used as a power voltage of a phase lock loop ("PLL") circuit embedded in the timing controller 101. The PLL circuit compares the reference clock signal DCLK input to the timing controller 101 with a reference frequency generated from an oscillator. Then, when it is identified from the comparison that there is a difference between these signals, the PPL circuit adjusts the frequency of the reference clock signal DCLK by the difference to generate a sampling clock signal. The sampling clock signal is a signal for sampling the image data signals DATA'.

The DC-DC converter 177 increases or decreases the driving power VCC input through the system to generate various voltages required for the display panel 110. To this end, the DC-DC converter 177 may include, for example, an output switching element for switching an output voltage of an output end thereof and a pulse width modulator PWM for adjusting a duty ratio or a frequency of a control signal applied to a control terminal of the output switching element so as to increase or decrease the output voltage. In some embodiments, the DC-DC converter 177 may include a pulse frequency modulator PFM in place of the pulse width modulator PWM.

The pulse width modulator PWM may increase the duty ratio of the aforementioned control signal to raise the output voltage of the DC-DC converter 177 or may decrease the duty ratio of the control signal to lower the output voltage of the DC-DC converter 177. The pulse frequency modulator PFM may increase the frequency of the aforementioned control signal to raise the output voltage of the DC-DC converter 177 or may decrease the frequency of the control signal to lower the output voltage of the DC-DC converter 177. The output voltage of the DC-DC converter 177 may include a reference voltage AVDD, a half reference voltage HAVDD, gamma reference voltages GMA, a common voltage Vcom, a gate high voltage VGH, and a gate low voltage VGL.

The gamma reference voltages GMA are voltages generated by voltage division of the reference voltage. The gamma reference voltages GMA are analog voltages that are applied to the data driver 111. The common voltage Vcom is applied to the common electrode of the display panel 133 via the data driver 111. The gate high voltage VGH is a high logic voltage of a gate signal and is set to be substantially equal to or higher than a threshold voltage of a thin film transistor TFT, and the gate low voltage VGL is a low logic voltage of the gate signal and is set to be an off voltage of the thin film transistor TFT. The gate high voltage VGH and the gate low voltage VGL are applied to the gate driver 112.

The gate driver 112 generates gate signals according to the gate control signal GCS provided from the timing controller 101 and sequentially applies the gate signals to the plurality of scan lines SL1 to SLi.

The gate driver 112 may include, for example, a shift register that shifts the gate start pulse according to the gate shift clock to generate the gate signals. The shift register may include a plurality of switching elements. The switching elements may be formed on a lower substrate through a substantially similar process through which the thin film transistor TFT in a display area is formed.

The data driver 111 receives the image data signals DATA' and the data control signals DCS from the timing controller 101. The data driver 111 samples the image data signals DATA' according to the data control signal DCS, sequentially latches the sampled image data signals corresponding to one horizontal line in each horizontal period, and applies the latched image data signals to the data lines DL1 to DLj concurrently (or substantially simultaneously).

For example, the data driver 111 converts the image data signals DATA' applied from the timing controller 101 into analog image data signals using the gamma reference voltages GMA input from the DC-DC converter 177 and applies the analog image data signals to the data lines DL1 to DLj.

The data driver 111 may include a gray level generator, which generates a plurality of gray level voltages using the half reference voltage HAVDD and the gamma reference voltages GMA applied from the DC-DC converter 177. The plurality of gray level voltages include a plurality of positive polarity gray level voltages and a plurality of negative polarity gray level voltages corresponding to the plurality of positive polarity gray level voltages. The plurality of positive polarity gray level voltages have a voltage value larger than that of the half reference voltage HAVDD, and the plurality of negative polarity gray level voltages have a voltage value less than that of the half reference voltage HAVDD. The data driver 111 converts the image data signals applied from the timing controller 101 into analog signals using the positive polarity gray level voltages and the negative polarity gray level voltages.

In an embodiment, the gray level generator may be disposed inside (e.g., may be integral with) or outside the data driver 111.

Figure 3:
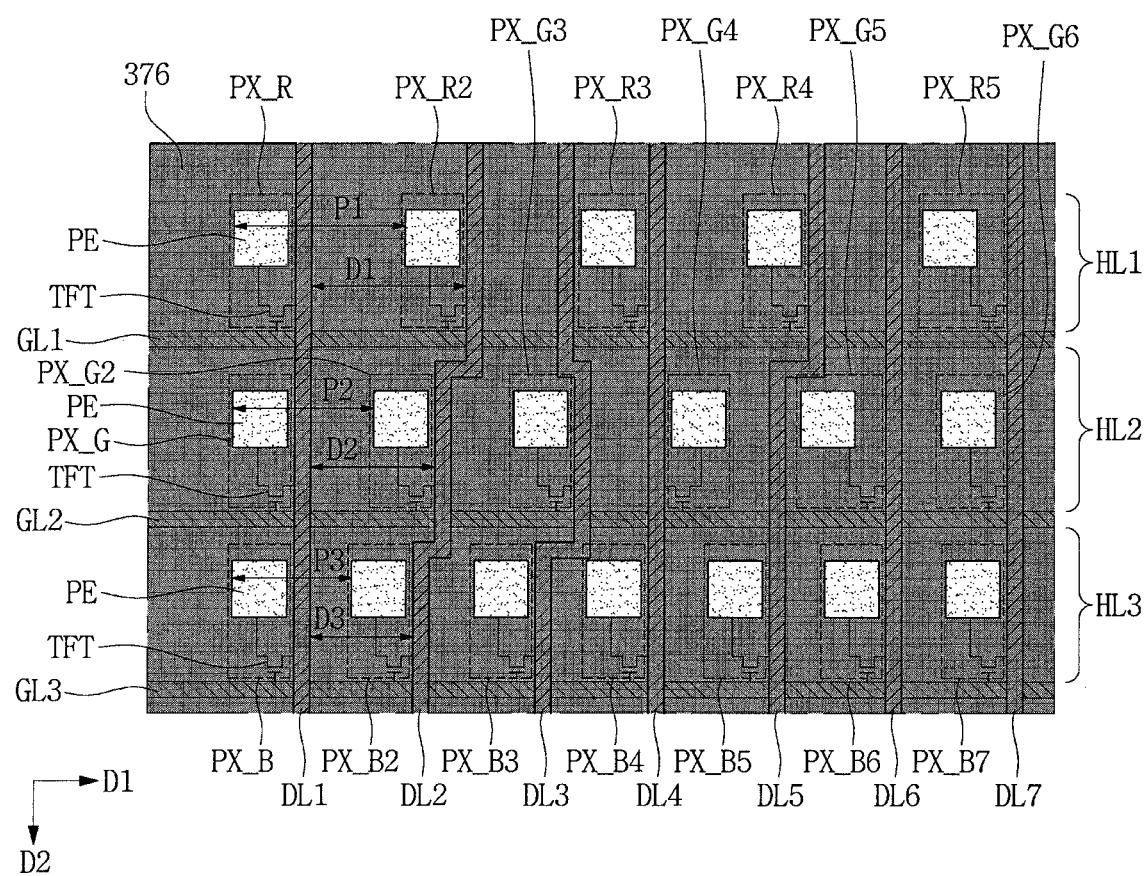
FIG. 3 illustrates a more detailed configuration of the pixels shown in FIG. 2.

FIG. 3 illustrates a more detailed configuration of the pixels shown in FIG. 2.

Five red pixels PX_R, PX_R2, PX_R3, PX_R4, and PX_R5 are illustrated in FIG. 3 and are defined as a first red pixel PX_R, a second red pixel PX_R2, a third red pixel PX_R3, a fourth red pixel PX_R4, and a fifth red pixel PX_R5, sequentially from a leftmost pixel in the first direction D1. Further, six green pixels PX_G, PX_G2, PX_G3, PX_G4, PX_G5, and PX_G6 are illustrated in FIG. 3 and are defined as a first green pixel PX_G, a second green pixel PX_G2, a third green pixel PX_G3, a fourth green pixel PX_G4, a fifth green pixel PX_G5, and a sixth green pixel PX_G6, sequentially from a leftmost pixel in the first direction D1. In addition, seven blue pixels PX_B, PX_B2, PX_B3, PX_B4, PX_B5, PX_B6, and PX_B7 are illustrated in FIG. 3 and are defined as a first blue pixel PX_B, a second blue pixel PX_B2, a third blue pixel PX_B3, a fourth blue pixel PX_B4, a fifth blue pixel PX_B5, a sixth blue pixel PX_B6, and a seventh blue pixel PX_B7, sequentially from a leftmost pixel in the first direction D1.

In addition, three gate lines GL1, GL2, and GL3 are illustrated in FIG. 3 and are defined as a first gate line GL1, a second gate line GL2, and a third gate line GL3, sequentially from an uppermost one in the second direction D2. In addition, seven data lines DL1, DL2, DL3, DL4, DL5, DL6, and DL7 are illustrated in FIG. 3 and are defined as a first data line DL1, a second data line DL2, a third data line DL3, a fourth data line DL4, a fifth data line DL5, a sixth data line DL6, and a seventh data line DL7, sequentially from a leftmost one in the first direction D1.

The red pixels PX_R, PX_R2, PX_R3, PX_R4, and PX_R5 are disposed in the first row HL1. The red pixels PX_R, PX_R2, PX_R3, PX_R4, and PX_R5 are connected in common to the first gate line GL1 and are individually connected to some of the first, second, third, fourth, fifth, sixth, and seventh data lines DL1, DL2, DL3, DL4, DL5, DL6, and DL7.

For example, the first red pixel PX_R is connected to the first gate line GL1 and the first data line DL1, the second red pixel PX_R2 is connected to the first gate line GL1 and the second data line DL2, the third red pixel PX_R3 is connected to the first gate line GL1 and the fourth data line DL4, the fourth red pixel PX_R4 is connected to the first gate line GL1 and the fifth data line DL5, and the fifth red pixel PX_R5 is connected to the first gate line GL1 and the seventh data line DL7. In this embodiment, the red pixels PX_R, PX_R2, PX_R3, PX_R4, and PX_R5 are not connected to the third data line DL3 and the sixth data line DL6.

The green pixels PX_G, PX_G2, PX_G3, PX_G4, PX_G5, and PX_G6 are disposed in the second row HL2. The green pixels PX_G, PX_G2, PX_G3, PX_G4, PX_G5, and PX_G6 are connected in common to the second gate line GL2 and are individually connected to some of the first, second, third, fourth, fifth, sixth, and seventh data lines DL1, DL2, DL3, DL4, DL5, DL6, and DL7.

For example, the first green pixel PX_G is connected to the second gate line GL2 and the first data line DL1, the second green pixel PX_G2 is connected to the second gate line GL2 and the second data line DL2, the third green pixel PX_G3 is connected to the second gate line GL2 and the third data line DL3, the fourth green pixel PX_G4 is connected to the second gate line GL2 and the fourth data line DL4, the fifth green pixel PX_G5 is connected to the second gate line GL2 and the sixth data line DL6, and the sixth green pixel PX_G6 is connected to the second gate line GL2 and the seventh data line DL7. In such an embodiment, the green pixels PX_G, PX_G2, PX_G3, PX_G4, PX_G5, and PX_G6 are not connected to the fifth data line DL5.

The blue pixels PX_B, PX_B2, PX_B3, PX_B4, PX_B5, PX_B6, and PX_B7 are disposed in the third row HL3. The blue pixels PX_B, PX_B2, PX_B3, PX_B4, PX_B5, PX_B6, and PX_B7 are connected in common to the third gate line GL3 and are individually connected to the first, second, third, fourth, fifth, sixth, and seventh data lines DL1, DL2, DL3, DL4, DL5, DL6, and DL7.

For example, the first blue pixel PX_B is connected to the third gate line GL3 and the first data line DL1, the second blue pixel PX_B2 is connected to the third gate line GL3 and the second data line DL2, the third blue pixel PX_B3 is connected to the third gate line GL3 and the third data line DL3, the fourth blue pixel PX_B4 is connected to the third gate line GL3 and the fourth data line DL4, the fifth blue pixel PX_B5 is connected to the third gate line GL3 and the fifth data line DL5, the sixth blue pixel PX_B6 is connected to the third gate line GL3 and the sixth data line DL6, and the seventh blue pixel PX_B7 is connected to the third gate line GL3 and the seventh data line DL7.

Some of the data lines may have a straight line shape, and some of the data lines may have a bent shape. For example, the first data line DL1, the fourth data line DL4, the sixth data line DL6, and the seventh data line DL7 may each have a straight line shape, and the second data line DL2, the third data line DL3, and the fifth data line DL5 may each have a bent shape.

A distance between adjacent data lines may be different for each row. In such an embodiment, the adjacent data lines refer to the data lines that are connected to the pixels in each row. For example, the first data line DL1 and the second data line DL2 are connected to the first red pixel PX_R and the second red pixel PX_R2, respectively, in the first row HL1, the first data line DL1 and the second data line DL2 are connected to the first green pixel PX_G and the second blue pixel PX_G2, respectively, in the second row HL2, and the first data line DL1 and the second data line DL2 are connected to the first blue pixel PX_B and the second blue pixel PX_B2, respectively, in the third row HL3.

A distance D1 (hereinafter, "a first distance") between the first data line DL1 and the second data line DL2 in the first row HL1, a distance D2 (hereinafter, "a second distance") between the first data line DL1 and the second data line DL2 in the second row HL2, and a distance D3 (hereinafter, "a third distance") between the first data line DL1 and the second data line DL2 in the third row HL3 may be different from each other. For example, the first distance D1 may be larger than the second distance D2, and the second distance D2 may be larger than the third distance D3.

Each of the pixels PX_R, PX_R2, PX_R3, PX_R4, and PX_R5, PX_G, PX_G2, PX_G3, PX_G4, PX_G5, and PX_G6, and PX_B, PX_B2, PX_B3, PX_B4, PX_B5, PX_B6, and PX_B7 includes a thin film transistor ("TFT") and a pixel electrode PE, as illustrated in FIG. 3.

The TFT of each of the pixels PX_R, PX_R2, PX_R3, PX_R4, and PX_R5, PX_G, PX_G2, PX_G3, PX_G4, PX_G5, and PX_G6, and PX_B, PX_B2, PX_B3, PX_B4, PX_B5, PX_B6, and PX_B7 is connected to a corresponding one of the gate lines, a corresponding one of the data lines, and a corresponding one of the pixel electrodes. For example, the TFT of the first red pixel PX_R is connected to the first gate line GL1 through a gate electrode of the TFT, connected to the first data line DL1 through a source electrode of the TFT, and connected to the pixel electrode PE of the first red pixel PX_R through a drain electrode of the TFT.

The TFT is turned on according to a gate signal applied from the gate line. The turned-on TFT applies an analog image data signal provided from the data line to the pixel electrode PE.

In an embodiment, the gate lines GL1, GL2, and GL3, the data lines DL1, DL2, DL3, DL4, DL5, DL6, and DL7, and the TFTs are covered by a light blocking layer 376.

A pitch of the red pixel PX_R (i.e., the first pitch P1) may be a pitch of the pixel electrode PE included in the red pixel PX_R. For example, the first pitch P1 may be a distance between one edge of a pixel electrode PE included in the first red pixel PX_R (hereinafter, "a first red pixel electrode") and one edge of (e.g., a same edge of) a pixel electrode included in the second red pixel PX_R2 (hereinafter, "a second red pixel electrode"). That is, the first pitch P1 may be a distance between one edge of the first red pixel electrode PE and one edge of the second red pixel electrode PE corresponding to the one edge of the first red pixel electrode PE.

A pitch of the green pixel PX_G (i.e., the second pitch P2) may be a pitch of the pixel electrode PE included in the green pixel PX_G. For example, the second pitch P2 may be a distance between one edge of a pixel electrode PE included in the first green pixel PX_G (hereinafter, "a first green pixel electrode") and one edge of a pixel electrode included in the second green pixel PX_G2 (hereinafter, "a second green pixel electrode"). That is, the second pitch P2 may be a distance between one edge of the first green pixel electrode PE and one edge of the second green pixel electrode PE corresponding to the one edge of the first green pixel electrode PE.

A pitch of the blue pixel PX_B (i.e., the third pitch P3) may be a pitch of the pixel electrode PE included in the blue pixel PX_B. For example, the third pitch P3 may be a distance between one edge of a pixel electrode PE included in the first blue pixel PX_B (hereinafter, "a first blue pixel electrode") and one edge of a pixel electrode included in the second blue pixel PX_B2 (hereinafter, "a second blue pixel electrode"). That is, the third pitch P3 may be a distance between one edge of the first blue pixel electrode PE and one edge of the second blue pixel electrode PE corresponding to the one edge of the first blue pixel electrode PE.

When a size of the third pitch P3 is "a", for example, a size of the second pitch P2 may be about 1.18a, and a size of the first pitch P1 may be about 1.42a, where "a" is a natural number. In other words, the second pitch P2 may be about 1.18 times the third pitch P3, and the first pitch P1 may be about 1.42 times the third pitch P3.

Figure 4:
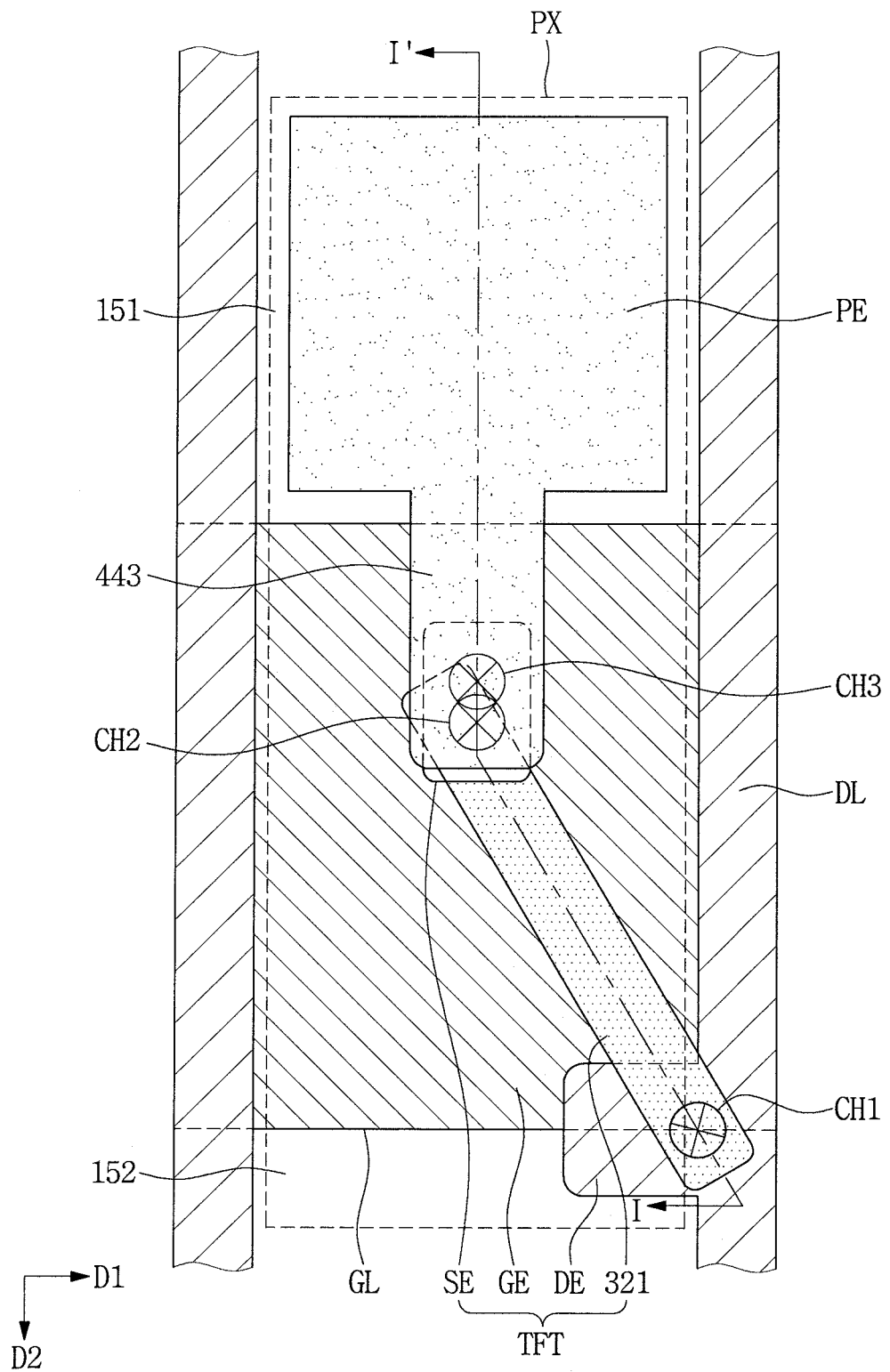
FIG. 4 is a plan view of one of the pixels shown in FIG. 3.
Figure 5:
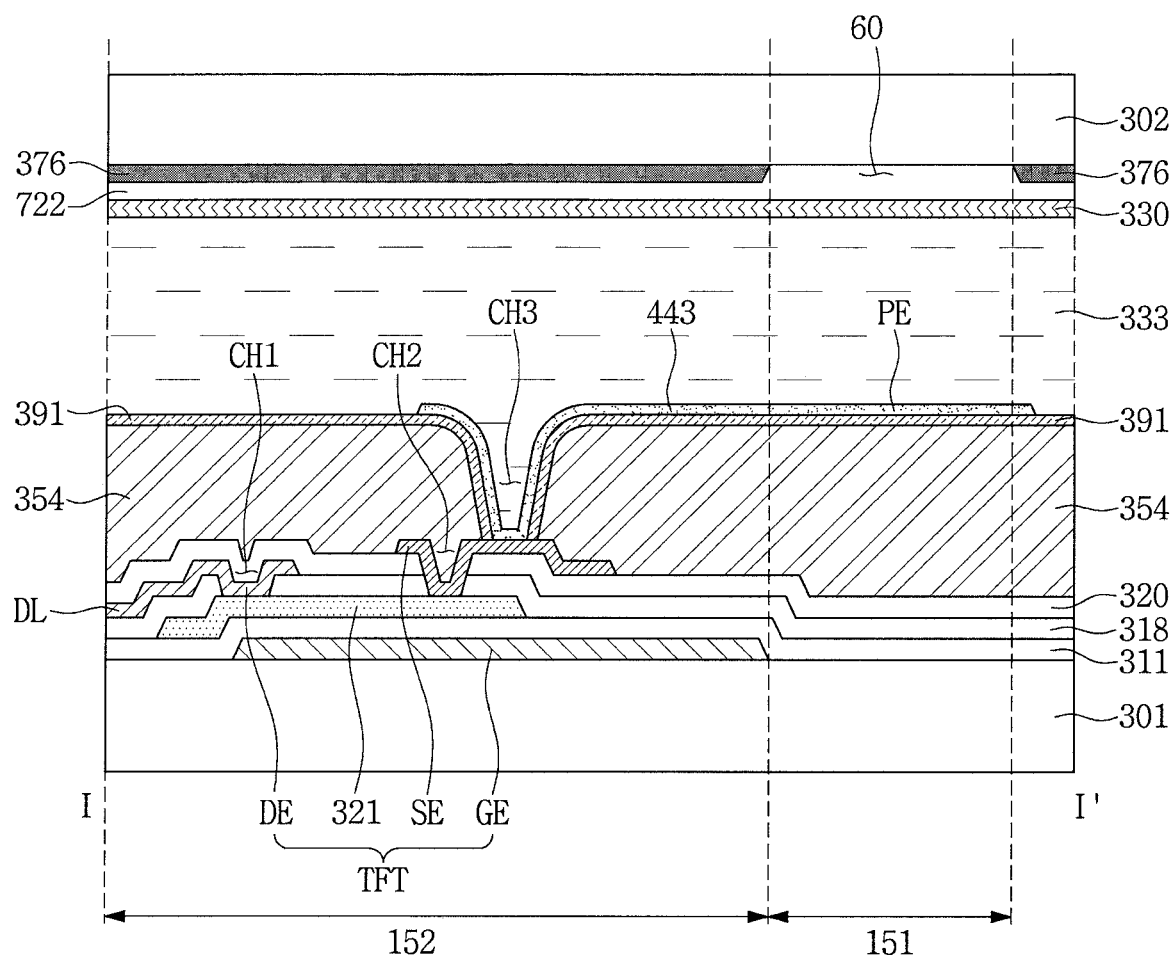
FIG. 5 is a cross-sectional view taken along the line I-I' of FIG. 4.

FIG. 4 is a plan view illustrating one of the pixels illustrated in FIG. 3, and FIG. 5 is a cross-sectional view taken along the line I-I' of FIG. 4.

The pixel PX may include the switching element TFT and the pixel electrode PE, as illustrated in FIG. 4.

The pixel PX is located between a first substrate 301 and a second substrate 302 of the display device, as illustrated in FIG. 5.

The display device includes the pixel PX, the first substrate 301, the second substrate 302, a gate insulating layer 311, an insulating interlayer 318, a protective layer 320, a capping layer 391, a color filter layer 354, a liquid crystal layer 333, a light blocking layer 376, an overcoat layer 722, and a common electrode 330. In some embodiments, the aforementioned pixel PX may further include the color filter layer 354. For example, the aforementioned red pixel PX_R of FIG. 3 may further include a red color filter layer, the aforementioned green pixel PX_G of FIG. 3 may further include a green color filter layer, and the aforementioned blue pixel PX_B of FIG. 3 may further include a blue color filter layer.

The pixel electrode PE is located corresponding to a light emission area (e.g., a pixel area) 151 of the pixel PX, and the switching element TFT is disposed in a light blocking area (e.g., a non-pixel area) 152 of the pixel PX. The light emission area 151 may have a planar area less than that of the light blocking area 152. For example, a ratio of the area of the light emission area 151 to the area of the light blocking area 152 may be about 3:7.

The switching element TFT is connected to the gate line GL, the data line DL, and the pixel electrode PE. The switching element TFT includes a gate electrode GE connected to the gate line GL, a drain electrode DE connected to the data line DL, a source electrode connected to the pixel electrode PE, and a semiconductor layer 321 to which the drain electrode DE and the source electrode SE are connected.

The switching element TFT may include a TFT.

The switching element TFT, the gate line GL, the data line DL, the gate insulating layer 311, the insulating interlayer 318, the protective layer 320, the color filter layer 354, the capping layer 391, and the pixel electrode PE are disposed on the first substrate 301. In other embodiments, the color filter layer 354 may be disposed on the second substrate 302 rather than on the first substrate 301.

The light blocking layer 376, the overcoat layer 722, and the common electrode 330 are disposed on the second substrate 302. In other embodiments, the light blocking layer 376 may be disposed on the first substrate 301 rather than on the second substrate 302.

The gate line GL is disposed on the first substrate 301. A connection portion (e.g., an end portion) of the gate line GL may have a larger area than another portion of the gate line GL to be connected to another layer or an external driving circuit.

The gate line GL may include or may be formed of one of: aluminum (Al) or alloys thereof, silver (Ag) or alloys thereof, copper (Cu) or alloys thereof, or molybdenum (Mo) or alloys thereof. The gate electrode GE may include or may be formed of one of: chromium (Cr), tantalum (Ta), and/or titanium (Ti). In some embodiments, the gate line GL may have a multilayer structure including a plurality of conductive layers that have different physical properties.

The gate electrode GE is a portion of the gate line GL. The gate electrode GE may include the same or a substantially similar material and may have the same or a substantially similar structure (e.g., a multilayer structure) as that of the gate line GL. The gate line GL and the gate electrode GE may be formed concurrently (or substantially simultaneously) in a process.

The gate insulating layer 311 is disposed on the gate line GL and the gate electrode GE, as illustrated in FIG. 5. In some embodiments, the gate insulating layer 311 may be located over an entire surface of the first substrate 301 including the gate line GL and the gate electrode GE. The gate insulating layer 311 may include or may be formed of silicon nitride ($SiN_x$) or silicon oxide ($SiO_x$). The gate insulating layer 311 may have a multilayer structure including a plurality of insulating layers having different physical properties.

The semiconductor layer 321 is disposed on the gate insulating layer 311, as illustrated in FIG. 5. As illustrated in FIGS. 4 and 5, the semiconductor layer 321 overlaps at least a portion of the gate electrode GE. The semiconductor layer 321 may include or may be formed of amorphous silicon, polycrystalline silicon, or the like.

The insulating interlayer 318 is disposed on the semiconductor layer 321 and the gate insulating layer 311, as illustrated in FIG. 5. In some embodiments, the insulating interlayer 318 is located over an entire surface of the first substrate 301 including the semiconductor layer 321. The insulating interlayer 318 has first and second contact holes (e.g., contact openings) CH1 and CH2. The insulating interlayer 318 may include or may be formed of silicon nitride ($SiN_x$), silicon oxide ($SiO_x$), or the like. The insulating interlayer 318 may have a multilayer structure including a plurality of insulating layers having different physical properties.

The data line DL and the drain electrode DE are disposed on the insulating interlayer 318, as illustrated in FIG. 5. In some embodiments, the drain electrode DE is connected to the semiconductor layer 321 through the first contact hole CH1 of the insulating interlayer 318. An ohmic contact layer may be further located at an interface between the drain electrode DE and the semiconductor layer 321.

The ohmic contact layer may include or may be formed of silicide or n+ hydrogenated amorphous silicon doped with n-type impurities, such as phosphorus (P) and hydrogen fluoride ($PH_3$), at high concentration.

A connection portion (e.g., an end portion) of the data line DL may have a larger area than another portion of the data line DL to be connected to another layer or an external driving circuit.

The data line DL crosses the gate line GL. A portion of the data line DL that crosses the gate line GL may have a line width that is less than a line width of another portion of the data line DL. Accordingly, a parasitic capacitance between the data line DL and the gate line GL may be reduced.

The data line DL may include or may be formed of a refractory metal, such as molybdenum, chromium, tantalum, titanium, and/or an alloy thereof. The data line DL may have a multilayer structure including a refractory metal layer and a low resistance conductive layer. Examples of the multilayer structure may include a double-layer structure including a chromium or molybdenum (alloy) lower layer and an aluminum (alloy) upper layer or a triple-layer structure including a molybdenum (alloy) lower layer, an aluminum (alloy) intermediate layer, and a molybdenum (alloy) upper layer. In another embodiment, the data line DL may include or may be formed of any suitable metals and/or conductors and is not limited to the aforementioned materials.

The drain electrode DE protrudes from the data line DL, as illustrated in FIG. 4. The drain electrode DE may be a portion of the data line DL. The drain electrode DE may include the same or substantially the same material and may have the same or substantially the same structure (e.g., a multilayer structure) as those of the data line DL. The drain electrode DE and the data line may be formed concurrently (or substantially simultaneously) in a process.

The protective layer 320 is disposed on the data line DL and the insulating interlayer 318, as illustrated in FIG. 5. In some embodiments, the protective layer 320 is located over an entire surface of the first substrate 301 including the data line DL and the insulating interlayer 318. The protective layer 320 also has the second contact hole CH2 which passes through a portion of the protective layer 320.

The protective layer 320 may include or may be formed of an inorganic insulating material, such as silicon nitride ($SiN_k$) or silicon oxide ($SiO_x$). In some embodiments, an inorganic insulating material having photosensitivity and a dielectric constant of about 4.0 may be used. In some embodiments, the protective layer 320 may have a double-layer structure including a lower inorganic layer and an upper organic layer. This double-layer structure is found to impart excellent insulating characteristics of an organic layer and to not damage an exposed portion of the semiconductor layers 321 and 322. The protective layer 320 may have a thickness greater than or equal to about 5000 Å, for example, in a range from about 6000 Å to about 8000 Å.

The source electrode SE is disposed on the protective layer 320, as illustrated in FIG. 5. In some embodiments, the source electrode SE is connected to the semiconductor layer 321 through the second contact hole CH2 in the protective layer 320 and the insulating interlayer 318. An ohmic contact layer may be further located at an interface between the source electrode SE and the semiconductor layer 321.

The source electrode SE may include the same or substantially the same material and may have the same or substantially the same structure (e.g., a multilayer structure) as those of the aforementioned data line DL.

The color filter layer 354 is disposed on the source electrode SE and the protective layer 320, as illustrated in FIG. 5. An edge of the color filter layer 354 is disposed on the gate line GL and the data line DL. The color filter layer 354 is not located at a portion corresponding to a third contact hole (e.g., contact opening) CH3. In some embodiments, an edge of the color filter layer 354 of one pixel may overlap an edge of a color filter layer of another pixel adjacent to the one pixel. The color filter layer 354 may include or may be formed of a photosensitive organic material.

The capping layer 391 is disposed on the color filter layer 354, as illustrated in FIG. 5. The capping layer 391 substantially prevents impurities that may be generated in the color filter layer 354 from diffusing into the liquid crystal layer 333. The capping layer 391 has the third contact hole CH3. The capping layer 391 may include or may be made of silicon nitride, silicon oxide, or the like.

The pixel electrode PE is disposed on the capping layer 391 to correspond to the light emission area 151, as illustrated in FIGS. 4 and 5.

The pixel electrode PE may include or may be formed of a transparent conductive material, such as indium tin oxide (ITO) or indium zinc oxide (IZO). In some embodiments, ITO may be a polycrystalline material or a monocrystalline material, and IZO may also be a polycrystalline material or a monocrystalline material. In some embodiments, IZO may be an amorphous material.

A connection electrode 443 is disposed on the capping layer 391. The connection electrode 443 extends from the pixel electrode PE to the non-pixel area (e.g., the light blocking area) 152. The connection electrode 443 is formed unitarily with (e.g., is integrally formed with) the pixel electrode PE. The connection electrode 443 has a planar area less than that of the pixel electrode PE. The connection electrode 443 is disposed in the pixel area (e.g., the light emission area) 151 and the non-pixel area 152. The connection electrode 443 is connected to the source electrode SE through the third contact hole CH3 in the capping layer 391.

The connection electrode 443 may include a material that is the same as or substantially the same as a material included in the pixel electrode PE. The connection electrode 443 and the pixel electrode PE may be formed concurrently (or substantially simultaneously) in a process. In other embodiments, the connection electrode 443 may include a material the same as or substantially the same as a material included in the source electrode SE. For example, the connection electrode 443 may be formed unitarily with (e.g., may be integrally formed with) the source electrode SE. In such an embodiment, the connection electrode 443 and the source electrode SE may be formed concurrently (or substantially simultaneously) in a process. In some embodiments, the connection electrode 443 is connected to the pixel electrode PE through a contact hole (e.g., a contact opening).

The light blocking layer 376 is disposed on the second substrate 302, as illustrated in FIG. 2. The light blocking layer 376 is disposed in the remaining area except the light emission area 151, that is, in the light blocking area 152. The light blocking layer 376 has an hole (e.g., a opening) 60 which defines the light emission area 151 of the pixel PX. In some embodiments, the light blocking layer 376 may be disposed on the first substrate 301 rather than on the second substrate.

The overcoat layer 722 is disposed on the light blocking layer 376. In some embodiments, the overcoat layer 722 may be disposed over an entire surface of the second substrate 302 including the light blocking layer 376. The overcoat layer 722 eliminates or substantially eliminates a height difference between components located between the overcoat layer 722 and the second substrate 302, such as components of the second substrate 302, including the light blocking layer 376. In some embodiments, the overcoat layer 722 may be omitted.

The common electrode 330 is disposed on the overcoat layer 722. In some embodiments, the common electrode 330 may be formed over an entire surface of the second substrate 302 including the overcoat layer 722. In other embodiments, the common electrode 330 may be disposed on the overcoat layer 722 to correspond to the pixel area 151. A common voltage is applied to the common electrode 330.

In some embodiments, the display device may further include a first polarizer and a second polarizer. For example, when facing surfaces of the first substrate 301 and the second substrate 302 are defined as inner surfaces of the corresponding substrates and surfaces on the opposite sides of the inner surfaces are respectively defined as outer surfaces of the corresponding substrates, the first polarizer is disposed on the outer surface of the first substrate 301 and the second polarizer is disposed on the outer surface of the second substrate 302.

A transmission axis of the first polarizer and a transmission axis of the second polarizer are orthogonal to each other, and one of these transmission axes is arranged parallel to the gate line GL. In some embodiments, the display device may include only one of the first polarizer and the second polarizer.

The first substrate 301 and the second substrate 302 are insulating substrates including glass or plastic.

The liquid crystal layer 333 between the first substrate 301 and the second substrate 302 includes liquid crystal molecules. These liquid crystal molecules may be twisted nematic liquid crystal molecules.

Figure 6:
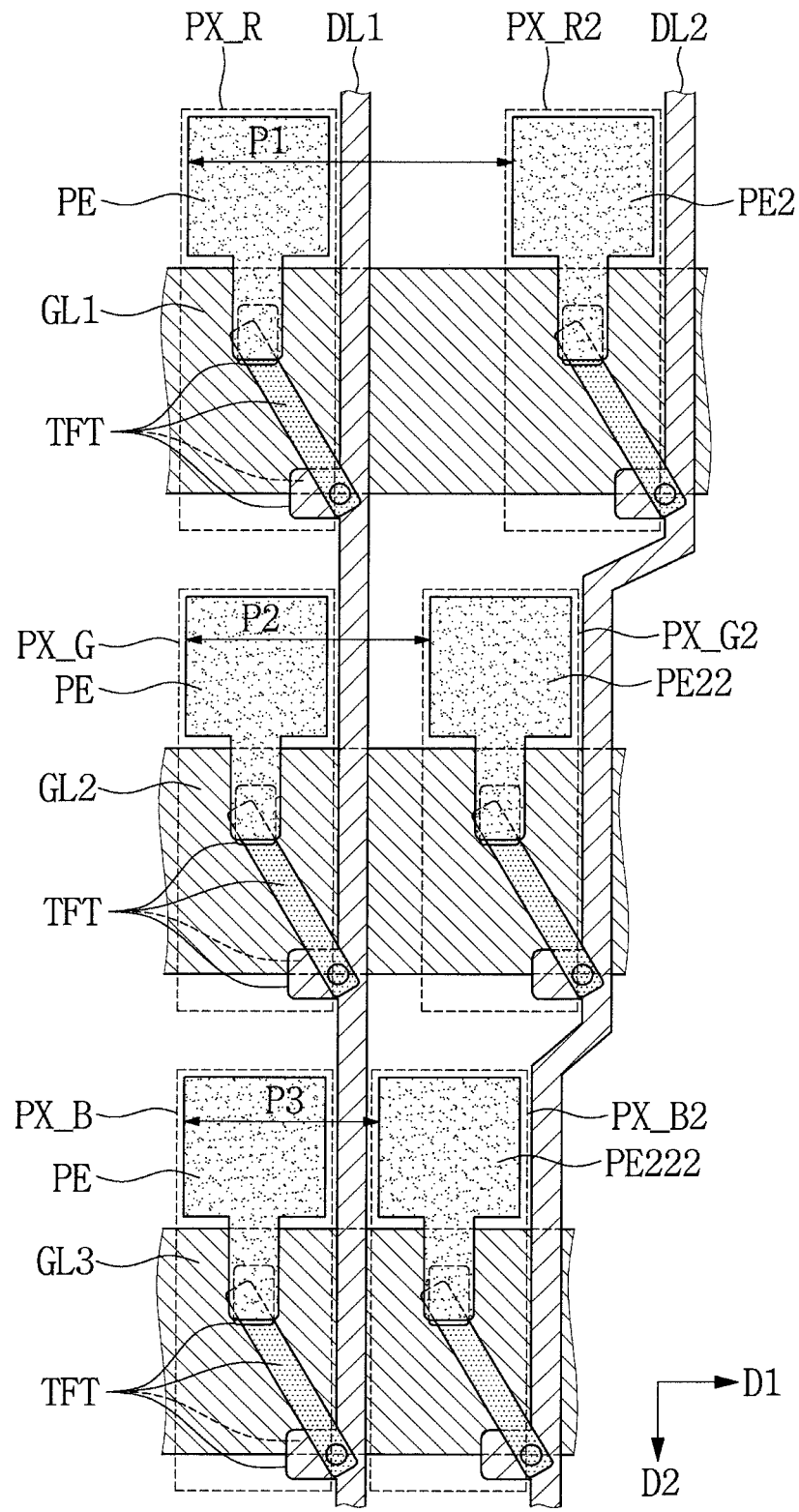
FIG. 6 illustrates a more detailed configuration of some of the pixels shown in FIG. 3.

FIG. 6 is a more detailed configuration view illustrating some of the pixels shown in FIG. 3.

As illustrated in FIG. 6, the first pitch P1 is defined by a distance between corresponding one side edges of pixel electrodes PE and PE2 which are respectively included in the red pixels PX_R and PX_R2 that are adjacent to each other in the first direction D1, the second pitch P2 is defined by a distance between corresponding one side edges of pixel electrodes PE and PE22 which are respectively included in the green pixels PX_G and PX_G2 that are adjacent to each other in the first direction D1, and the third pitch P3 is defined by a distance between corresponding one side edges of pixel electrodes PE and PE222 which are respectively included in the blue pixels PX_B and PX_B2 that are adjacent to each other in the first direction D1.

For example, the first pitch P1 may be a distance between a left edge of the pixel electrode PE included in the red pixel PX_R and a left edge of the pixel electrode PE2 that is adjacent to the left edge in the first direction D1, the second pitch P2 may be a distance between a left edge of the pixel electrode PE included in the green pixel PX_G and a left edge of the pixel electrode PE22 that is adjacent to the left edge in the first direction D1, and the third pitch P3 may be a distance between a left edge of the pixel electrode PE included in the blue pixel PX_B and a left edge of the pixel electrode PE222 that is adjacent to the left edge in the first direction D1.

Figure 7:
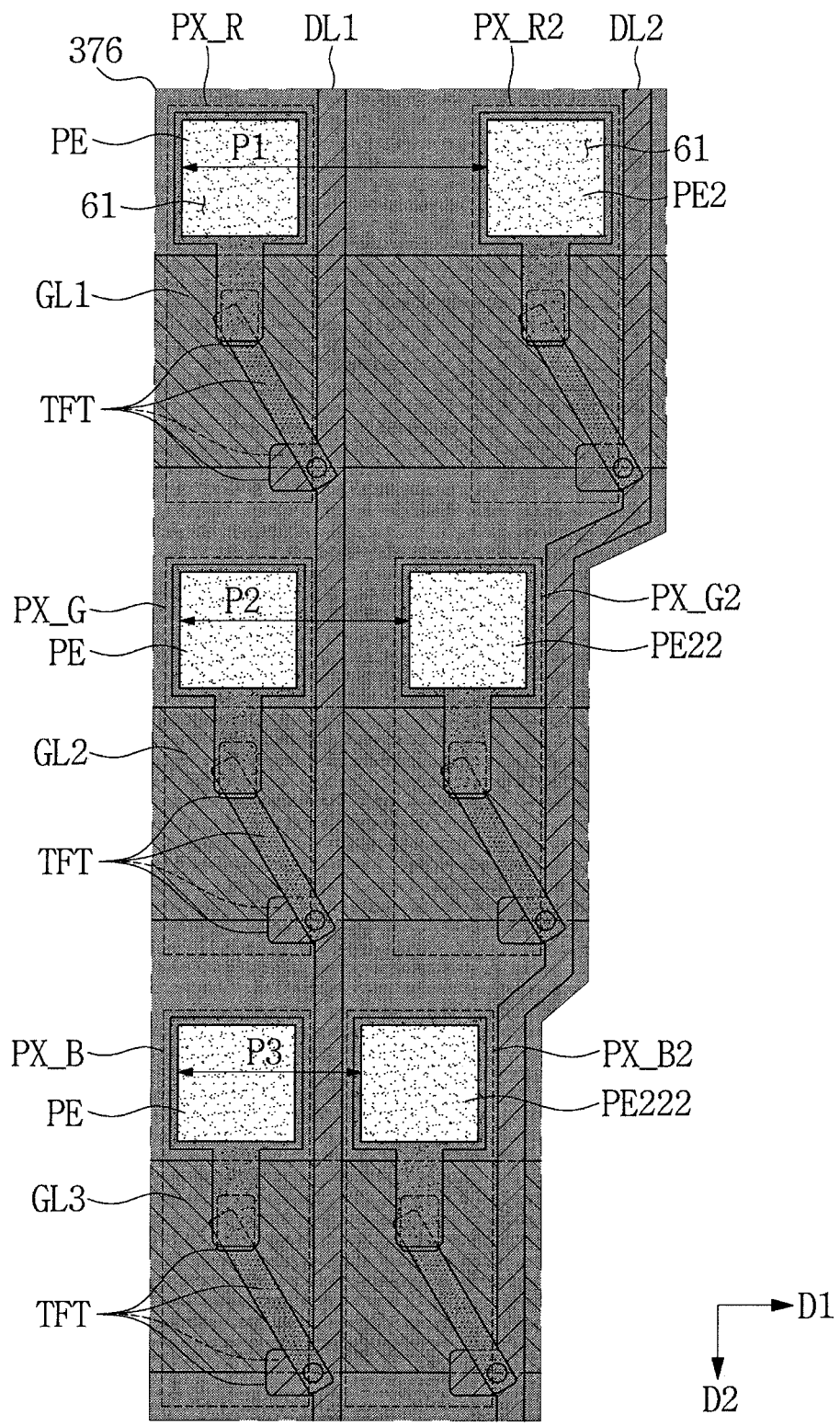
FIG. 7 shows the configuration of the pixels shown in FIG. 6 further including a light blocking layer.

FIG. 7 is a view of FIG. 6 further including a light blocking layer.

In an embodiment, the first pitch P1, the second pitch P2, and the third pitch P3 may be a pitch of the holes 60 in the light blocking layer 376.

For example, the first pitch P1 may be defined by a distance between corresponding inner walls of holes (e.g., openings) 60 and 61 which respectively expose the pixel electrodes PE and PE2 of the red pixels PX_R and PX_R2 that are adjacent to each other in the first direction D1, the second pitch P2 may be defined by a distance between corresponding inner walls of holes (e.g., openings) 60 and 62 which respectively expose the pixel electrodes PE and PE22 of the green pixels PX_G and PX_G2 that are adjacent to each other in the first direction D1, and the third pitch P3 may be defined by a distance between corresponding inner walls of holes (e.g., openings) 60 and 63 which respectively expose pixel electrodes PE and PE222 of the blue pixels PX_B and PX_B2 that are adjacent to each other in the first direction D1.

As a more specific example, the first pitch P1 may be a distance between a left inner wall of the hole 60 corresponding to the red pixel PX_R and a left inner wall of the hole 61 that is adjacent to the hole 60 in the first direction D1, the second pitch P2 may be a distance between a left inner wall of the hole 60 corresponding to the green pixel PX_G and a left inner wall of the hole 62 that is adjacent to the hole 60 in the first direction D1, and the third pitch P3 may be a distance between a left inner wall of the hole 60 corresponding to the blue pixel PX_B and a left inner wall of the hole 63 that is adjacent to the hole 60 in the first direction D1.

The pixel electrodes PE included in the red pixels PX_R and the holes 60 located corresponding to the red pixels PX_R may have the same or substantially the same pitch, the pixel electrodes PE included in the green pixels PX_G and the holes 60 located corresponding to the green pixels PX_G may have the same or substantially the same pitch, and the pixel electrodes PE included in the blue pixels PX_B and the holes 60 located corresponding to the blue pixels PX_B may have the same or substantially the same pitch. For example, the pitch of the pixel electrodes PE of the red pixels PX_R and the pitch of the holes 60 of the red pixels PX_R may be the same or substantially the same as each other, the pitch of the pixel electrodes PE of the green pixels PX_G and the pitch of the holes 60 of the green pixels PX_G may be the same or substantially the same as each other, and the pitch of the pixel electrodes PE of the blue pixels PX_B and the pitch of the holes 60 of the blue pixels PX_B may be the same or substantially the same as each other.

Figure 8:
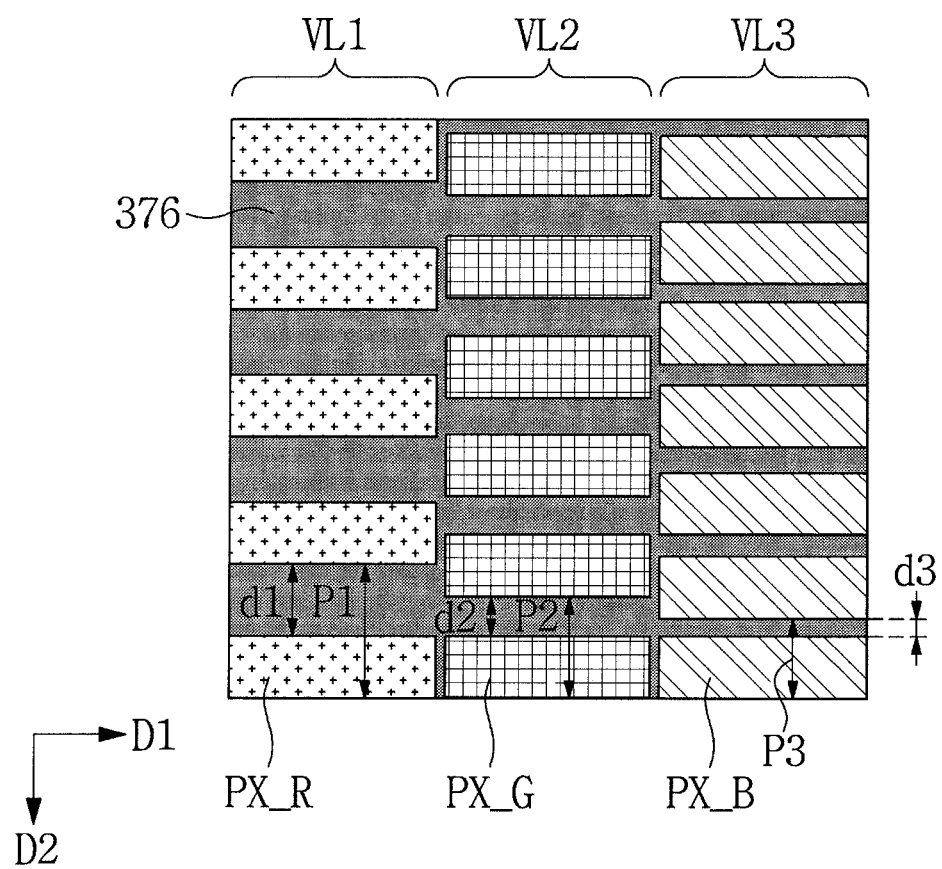
FIG. 8 illustrates several adjacent pixels from among pixels of the display panel shown in FIG. 1 according to another embodiment of the present invention.

FIG. 8 is a view illustrating several adjacent pixels from among pixels of the display panel shown in FIG. 1 according to another embodiment of the present invention.

Pixels PX_R, PX_G and PX_B include a red pixel PX_R for displaying red color light, a green pixel PX_G for displaying green color light, and a blue pixel PX_B for displaying blue color light, as illustrated in FIG. 8. The pixels may further include at least one of a cyan pixel, a magenta pixel, a yellow pixel, and a white pixel.

The red pixels PX_R are disposed in a first column VL1 (e.g., a first vertical line) of the display panel 133. The red pixels PX_R are arranged along the second direction D2 in the first column VL1. The red pixels PX_R may be further disposed, for example, in a fourth column, a seventh column, a tenth column, and the like of the display panel 133. In other words, the red pixels PX_R are disposed in (3q−2)-th columns, where q is a natural number.

The green pixels PX_G are disposed in a second column VL2 (e.g., a second vertical line) of the display panel 133. The green pixels PX_G are arranged along the second direction D2 in the second column VL2. The green pixels PX_G may be further disposed, for example, in a fifth column, an eighth column, an eleventh column, and the like of the display panel 133. In other words, the green pixels PX_G are disposed in (3q−1)-th columns.

The blue pixels PX_B are disposed in a third column VL3 (e.g., a third vertical line) of the display panel 133. The blue pixels PX_B are arranged along the second direction D2 in the third column VL3. The blue pixels PX_B may be further disposed, for example, in a sixth column, a ninth column, a twelfth column, and the like of the display panel 133. In other words, the blue pixels PX_B are disposed in 3q-th columns.

The pixels in different rows are arranged along the first direction D1. For example, the red pixel PX_R, the green pixel PX_G, and the blue pixel PX_B are arranged (e.g., are adjacent each other) along the first direction D1.

A pitch (e.g., an interval) between the red pixels PX_R that are adjacent to each other in the second direction D2 is defined as a first pitch P1, a pitch (e.g., an interval) between the green pixels PX_G that are adjacent to each other in the second direction D2 is defined as a second pitch P2, and a pitch (e.g., an interval) between the blue pixels PX_B that are adjacent to each other in the second direction D2 is defined as a third pitch P3. In such an embodiment, the pitch of the pixels is defined as a distance between a specific point of one of two pixels of a same color that are adjacent to each other in the second direction D2 to a specific point, corresponding to the specific point, of the other of the two pixels. In such an embodiment, the distance is a distance measured in the second direction D2.

The pixels PX_R, PX_G, and PX_B may have different pitches for respective colors (e.g., the first pitch P1, the second pitch P2, and the third pitch P3 may be different from each other). For example, as the wavelength of a color displayed by a pixel increases, the pixel may have a greater pitch. For example, red light has a greatest wavelength (e.g., about 640 nm) from among red light, green light, and blue light, and the red pixel PX_R has the first pitch P1, which is largest from among the three color pixels. Further, blue light has a smallest wavelength (e.g., about 450 nm) from among red light, green light, and blue light, and the blue pixel PX_B has the third pitch P3, which is smallest from among the three color pixels. In addition, green light has a wavelength (e.g., about 532 nm) between the wavelengths of red light and blue light, and the green pixel PX_G has the second pitch P2, which is greater than the third pitch P3 and less than the first pitch P1.

Due to such a pitch difference, a distance d1 (hereinafter, "a first distance") between adjacent red pixels PX_R, a distance d2 (hereinafter, "a second distance") between adjacent green pixels PX_G, and a distance d3 (hereinafter, "a third distance") between adjacent blue pixels PX_B are different from each other. For example, the first distance d1 is larger than the second distance d2, and the second distance d2 is larger than the third distance d3. In other words, the second distance d2 is larger than the third distance d3 and less than the first distance d1.

Because the pitch of the pixels is determined in proportion to the wavelength of the display color of the pixel, interference images, which are diffracted according to color, may be displayed at a substantially same position regardless of color. Accordingly, the image quality of 3D images may be improved.

In FIG. 8, the red pixels PX_R may be connected to a same data line, the green pixels PX_G may be connected to a same data line, and the blue pixels PX_B may be connected to a same data line. The red pixel PX_R, the green pixel PX_G, and the blue pixel PX_B are connected to different data lines from each other.

In FIG. 8, a red pixel PX_R, a green pixel PX_G, and a blue pixel PX_B that are adjacent to each other may be connected to a same gate line.

In an embodiment in which the display panel 133 is an OLED display panel, the pitch of the pixels may be set in proportion to the wavelength of a light emitting layer of each pixel. For example, a pitch of a red pixel including a red light emitting layer may be defined by the first pitch P1 described above, a pitch of a green pixel including a green light emitting layer may be defined as the second pitch P2 described above, and a pitch of a blue pixel including a blue light emitting layer may be defined as a third pitch P3 described above.

In some embodiments, the pitch of pixels is set in proportion to the wavelength of a displayed (or emitted) color, and thus, interference images which are diffracted according to color may be displayed at a substantially same position. Accordingly, the image quality of the 3D images may be improved.

In some embodiments, the pitch of the green pixel and the pitch of the blue pixel are less than the pitch of the red pixel, and thus, the viewing angle of the display device may be improved.

While the present invention has been illustrated and described with reference to exemplary embodiments thereof, it will be apparent to those of ordinary skill in the art that various changes in form and detail may be made thereto without departing from the spirit and scope of the present invention as defined by the appended claims and their equivalents.

What is claimed is:

1. A display device comprising a plurality of first pixels and a plurality of second pixels, the first and second pixels being configured to display different colors from each other, a pitch between adjacent ones of the first pixels in a first direction being different from a pitch between adjacent ones of the second pixels in the first direction, a minimum distance between the adjacent ones of the first pixels in the first direction being greater than a minimum distance between the adjacent ones of the second pixels in the first direction,
wherein:
the first pixels and the second pixels have switching elements, respectively,
the switching elements are not disposed between the adjacent ones of the first pixels in the first direction,
the switching elements are not disposed between the adjacent ones of the second pixels in the first direction,
any pixels different from the first pixels are not disposed along with the adjacent ones of the first pixels in the same row or column in the first direction, and
any pixels different from the second pixels are not disposed along with the adjacent ones of the second pixels in the same row or column in the first direction.

2. The display device of claim 1, wherein a pitch between pixel electrodes of the adjacent ones the first pixels is different from a pitch between pixel electrodes of the adjacent ones of the second pixels.

3. The display device of claim 1, further comprising a light blocking layer having first holes and second holes,
wherein the first holes define light emission areas of the first pixels, and the second holes define light emission areas of the second pixels.

4. The display device of claim 3, wherein a pitch between adjacent ones of the first holes in the first direction is different from a pitch between adjacent ones of the second holes in the first direction.

5. The display device of claim 1, wherein the first pixels are configured to display a color having a wavelength greater than a wavelength of a color displayed by the second pixels, and
wherein the pitch between the adjacent ones of the first pixels is greater than the pitch between the adjacent ones of the second pixels.

6. The display device of claim 5, wherein the first pixels are configured to display red, and the second pixels are configured to display one of green or blue.

7. The display device of claim 5, wherein the first pixels are configured to display green, and the second pixels are configured to display blue.

8. The display device of claim 1, further comprising a plurality of third pixels configured to display a color different from colors displayed by the first and second pixels,
wherein the pitch between the adjacent ones of the first pixels, the pitch between the adjacent ones of the second pixels, and a pitch between adjacent ones of the third pixels in the first direction are different from each other.

9. The display device of claim 8, wherein the first pixels are configured to display a first color having a first wavelength, the second pixels are configured to display a second color having a second wavelength, and the third pixels are configured to display a third color having a third wavelength,
wherein the first wavelength is greater than the second wavelength, and the second wavelength is greater than the third wavelength, and
wherein the pitch between the adjacent ones of the first pixels is greater than the pitch between the adjacent ones of the second pixels, and the pitch between the adjacent ones of the second pixels is greater than the pitch between the adjacent ones of the third pixels.

10. The display device of claim 9, wherein the first pixels are configured to display red, the second pixels are configured to display green, and the third pixels are configured to display blue.

11. The display device of claim 1, wherein the first pixels and the second pixels are respectively arranged in pixel lines arranged along a second direction which crosses the first direction.

12. The display device of claim 11, further comprising:
a first data line connected to one of the adjacent ones of the first pixels and to one of the adjacent ones of the second pixels; and
a second data line connected to the other of the adjacent ones of the first pixels and to the other of the adjacent ones of the second pixels.

13. The display device of claim 1, further comprising a data line located between the adjacent ones of the first pixels and between the adjacent ones of the second pixels,
wherein the data line is connected to one of the first pixels and is not connected to the second pixels.

14. The display device of claim 1, further comprising a first gate line connected to the adjacent ones of the first pixels; and
a second gate line connected to the adjacent ones of the second pixels.

15. A display device comprising:
a plurality of first pixels and a plurality of second pixels, the first and second pixels being configured to display different colors from each other, a pitch between adjacent ones of the first pixels in a first direction being different from a pitch between adjacent ones of the second pixels in the first direction, a minimum distance between the adjacent ones of the first pixels in the first direction being greater than a minimum distance between the adjacent ones of the second pixels in the first direction;
a first data line connected to one of the adjacent ones of the first pixels and to one of the adjacent ones of the second pixels; and
a second data line connected to the other of the adjacent ones of the first pixels and to the other of the adjacent ones of the second pixels, wherein:
the first pixels and the second pixels are respectively arranged in pixel lines arranged along a second direction which crosses the first direction,
a distance between the first data line and the second data line in the pixel line in which the adjacent ones of the first pixels are arranged is different from a distance between the first data line and the second data line in the pixel line in which the adjacent ones of the second pixels are arranged.

16. A display device comprising:
a plurality of first pixels, each of the first pixels comprising a first switching element, a first pixel electrode connected to the first switching element, and a first color filter layer located corresponding to the first pixel electrode; and
a plurality of second pixels, each of the second pixels comprising a second switching element, a second pixel electrode connected to the second switching element, and a second color filter layer located corresponding to the second pixel electrode, the second color filter layer configured to emit a color different from a color of the first color filter layer,
wherein a pitch between every adjacent ones of the first pixel electrodes in a first direction is different from a pitch between every adjacent ones of the second pixel electrodes in the first direction,
wherein the first pixels are arranged along the first direction in a first row,
wherein the second pixels are arranged along the first direction in a second row, and
wherein the first pixels and the second pixels are respectively arranged in pixel lines arranged along a second direction which crosses the first direction.

17. The display device of claim 16, further comprising a light blocking layer having first holes and second holes,
wherein the first holes define light emission areas of the first pixels, and
the second holes define light emission areas of the second pixels.

18. The display device of claim 17, wherein a pitch between adjacent ones of the first holes in the first direction is different from a pitch between adjacent ones of the second holes in the first direction.

19. The display device of claim 16, wherein the first color filter layer is configured to emit a first color having a first wavelength, and the second color filter layer is configured to emit a second color having a second wavelength, the first wavelength being greater than the second wavelength, and
wherein the pitch between the adjacent ones of the first pixel electrodes is greater than the pitch between the adjacent ones of the second pixel electrodes.

20. The display device of claim 19, wherein the first color filter layer is a red color filter layer, and the second color filter layer is one of a green color filter layer and a blue color filter layer.

21. The display device of claim 19, wherein the first color filter layer is a green color filter layer, and the second color filter layer is a blue color filter layer.

22. The display device of claim 16, further comprising a plurality of third pixels, each of the third pixels comprising a third switching element, a third pixel electrode connected to the third switching element, and a third color filter layer located corresponding to the third pixel electrode, the third color filter layer configured to emit a color different from the colors of the first and second color filter layers,
wherein the pitch between the adjacent ones of the first pixel electrodes, the pitch between the adjacent ones of the second pixel electrodes, and a pitch between adjacent ones of the third pixel electrodes in the first direction are different from each other.

23. The display device of claim 22, wherein the first color filter layer is configured to emit a first color having a first wavelength, the second color filter layer is configured to emit a second color having a second wavelength, and the third color filter layer is configured to emit a third color having a third wavelength,
wherein the first wavelength is greater than the second wavelength, and the second wavelength is greater than the third wavelength, and
wherein the pitch between the adjacent ones of the first pixel electrodes is greater than the pitch between the adjacent ones of the second pixel electrodes, and the pitch between the adjacent ones of the second pixel electrodes is greater than the pitch between the adjacent ones of the third pixel electrodes.

24. The display device of claim 23, wherein the first color filter layer is a red color filter layer, the second color filter layer is a green color filter layer, and the third color filter layer is a blue color filter layer.

* * * * *